(12) United States Patent
Brown et al.

(10) Patent No.: US 7,049,870 B2
(45) Date of Patent: May 23, 2006

(54) DIGITAL CONTROLLERS FOR DC CONVERTERS

(75) Inventors: David Alan Brown, Carp (CA); Muge Guher, Ottawa (CA)

(73) Assignee: Potentia Semiconductor Corporation, Kanata, Ontario (CA)

( * ) Notice: Subject to any disclaimer, the term of this patent is extended or adjusted under 35 U.S.C. 154(b) by 40 days.

(21) Appl. No.: 10/753,337

(22) Filed: Jan. 9, 2004

(65) Prior Publication Data

US 2005/0151571 A1    Jul. 14, 2005

(51) Int. Cl.
*H03K 3/017* (2006.01)
*H03K 5/04* (2006.01)

(52) U.S. Cl. ...................... 327/172; 327/175
(58) Field of Classification Search ............... 372/172, 372/175, 176; 363/21.11, 21.18, 26, 41

See application file for complete search history.

(56) References Cited

U.S. PATENT DOCUMENTS

| | | | | |
|---|---|---|---|---|
| 5,148,168 A | * | 9/1992 | Masuda et al. | 341/152 |
| 6,008,594 A | * | 12/1999 | Kita et al. | 315/307 |
| 6,115,266 A | * | 9/2000 | Matsui et al. | 363/21.13 |
| 6,160,722 A | * | 12/2000 | Thommes et al. | 363/37 |
| 6,396,317 B1 | * | 5/2002 | Roller et al. | 327/113 |
| 6,545,621 B1 | | 4/2003 | Madni et al. | 341/143 |

* cited by examiner

*Primary Examiner*—Tuan T. Lam

(57) ABSTRACT

A digital controller for a DC converter has a timing and control unit which produces a control pulse signal with varying duty cycle and frequency in accordance with pulse on- and off-times determined by digital values read from a look-up table addressed via an A-D converter in dependence upon an input voltage for the DC converter. The stored digital values are such that a period of the control pulse signal varies over a range of about two-thirds to about four-thirds of a nominal value. Closed loop feedback control can be added by modifying addressing of the look-up in dependence upon an error signal from the DC converter output voltage, with scaling depending on the input voltage.

25 Claims, 3 Drawing Sheets

DIGITAL CONTROLLERS FOR DC CONVERTERS

This invention relates to digital controllers, and is particularly concerned with digital controllers which are suitable for controlling DC converters.

BACKGROUND

The term "DC converter" or simply "converter" is used herein to include all forms of DC converters, also referred to as DC-to-DC converters, DC or DC-to-DC regulators, switch mode regulators, converters, or power supplies, etc., whether or not they include an isolating transformer. The term "regulator" is used herein to refer to a converter without an isolating transformer, and a converter with an isolating transformer is referred to herein as an "isolated converter".

Controllers in accordance with this invention are intended to be particularly suitable for a forward or buck converter, and the invention is accordingly described in this context. However, the invention is not limited in this respect and the controller may also be used for other converter topologies and/or in other applications. A buck regulator is a step-down converter which converts an input voltage to a lower magnitude output voltage; in an isolated buck converter the relationship between the input and output voltages is modified by the transformation ratio of the isolating transformer.

A DC converter can be controlled using open loop and/or closed loop control which may involve analog and/or digital techniques. For example, PWM (pulse width modulation) can be used in a closed loop control arrangement in which the converter output voltage is compared with a reference voltage to produce an error signal, and the error signal is used to control the PWM.

A digital PWM control arrangement, in which there is at least one digital signal in dependence upon which the PWM is controlled, may be desirable. However, digital PWM involves a disadvantage in that the resolution or step size for regulating the converter output voltage is dependent upon the resolution with which the PWM pulse width can be adjusted, so that very high resolution of the PWM pulse width may be required to provide a desired regulation of the converter output voltage. This, in turn, involves the disadvantage of a very high clock frequency for the PWM control arrangement.

These difficulties are exacerbated when the buck converter operates with a small duty cycle (i.e. when the PWM pulse width is small compared with the PWM period) to provide a large step-down from an input voltage which is much larger than the output voltage. Although the need for operation with a small duty cycle can be reduced in some cases by taking advantage of the transformation ratio of the transformer of an isolated converter, this is not the case where the converter is required to operate from a wide range of possible input voltages.

Although it would be possible to reduce the switching frequency (i.e. increase the PWM period) of the converter to reduce these difficulties, this is undesirable because it would also significantly increase the size of filter components required.

Accordingly, there is a need for an improved digital controller which is suitable for controlling DC converters.

SUMMARY OF THE INVENTION

According to one aspect, this invention provides a digital controller for producing a control pulse signal with a variable frequency and a duty cycle dependent upon a first digital value representing a first variable, comprising: a digital circuit responsive to the first digital value for producing second and third digital values representing an on-time of a pulse and an off-time between pulses of the control pulse signal; and a timing and control unit responsive to the second and third digital values to produce the control pulse signal with pulses dependent upon said on-time and off-time; wherein the second and third digital values are produced so that a sum of the on-time and the off-time varies, depending on the first digital value, within a predetermined range including a predetermined nominal period of the control pulse signal.

Preferably the predetermined range is about two-thirds to about four-thirds of the predetermined nominal period.

The digital circuit preferably comprises a look-up table in which the second and third digital values are stored for respective first digital values.

In an embodiment of the invention, the second and third digital values are represented using a first and a second number of bits, respectively, in a first part of the table and are represented using a third and a fourth number of bits, respectively, in a second part of the table, the third and fourth numbers being different from the first and second numbers, respectively, and having a sum equal to a sum of the first and second numbers. The table can also be arranged to store a pointer to a transition between the first and second parts of the table.

The digital controller can comprise a further digital circuit responsive to a further digital value representing a second variable for modifying the first digital value in dependence upon the further digital value. The further digital circuit can comprise: a digital circuit responsive to the further digital value for producing a digital multiplier value in dependence upon a difference between the second variable and a reference value; a multiplier for multiplying the first digital value by the digital multiplier value to produce a digital correction value; and an adder for adding the digital correction value to the first digital value to produce a modified first digital value.

The invention also provides, in combination, a DC converter, a digital controller as recited above, and an A-D (analog-to-digital) converter for producing the first digital value in dependence upon an input voltage of the DC converter, wherein the DC converter comprises at least one switch controlled by the control pulse signal. The combination can also comprise an A-D converter for producing the further digital value in dependence upon an output voltage of the DC converter.

Another aspect of the invention provides a digital controller for producing a control pulse signal for a switch of a DC converter for varying a duty cycle and a switching frequency of the DC converter in dependence upon an input voltage for the DC converter, the digital controller comprising: an A-D (analog-to-digital) converter for producing a first digital value in dependence upon said input voltage; a timing and control unit for producing the control pulse signal with pulse on- and off-times determined in dependence upon second and third digital values; and a look-up table in which the second and third digital values are stored for respective first digital values, the look-up table being responsive to the first digital value to provide respective stored second and third digital values to the timing and control unit; wherein the stored second and third digital values are such that a sum of the on- and off-times varies, depending on the first digital value, over a predetermined range which includes a predetermined nominal period of the control pulse signal.

A further aspect of the invention provides a digital controller for producing a control pulse signal, comprising: a look-up table for storing, and for providing in response to a first digital value in dependence upon which the look-up table is addressed, respective second and third digital values representing an on-time of a pulse and an off-time between pulses of the control pulse signal; and a timing and control unit responsive to the second and third digital values to produce the control pulse signal with pulses determined by said on-time and off-time; wherein the second and third digital values stored in the look-up table are such that: for providing the control pulse signal with a small duty cycle the second digital value representing the on-time is small compared with the third digital value; for providing the control pulse signal with an increased duty cycle the second digital value is unchanged and the third digital value is decreased whereby a frequency of the control pulse signal is increased; for providing the control pulse signal with a further increased duty cycle the second digital value is increased and the third digital value is increased whereby the frequency of the control pulse signal is decreased; and for providing the control pulse signal with a yet further increased duty cycle the second digital value is again unchanged and the third digital value is decreased whereby the frequency of the control pulse signal is increased.

The second and third digital values are preferably such that the frequency of the control pulse signal varies over a range of up to about 2:1.

BRIEF DESCRIPTION OF THE DRAWINGS

The invention will be further understood from the following description by way of example with reference to the accompanying drawings, in which the same references are used in different figures to denote similar elements and in which.

DETAILED DESCRIPTION

Figure 1:
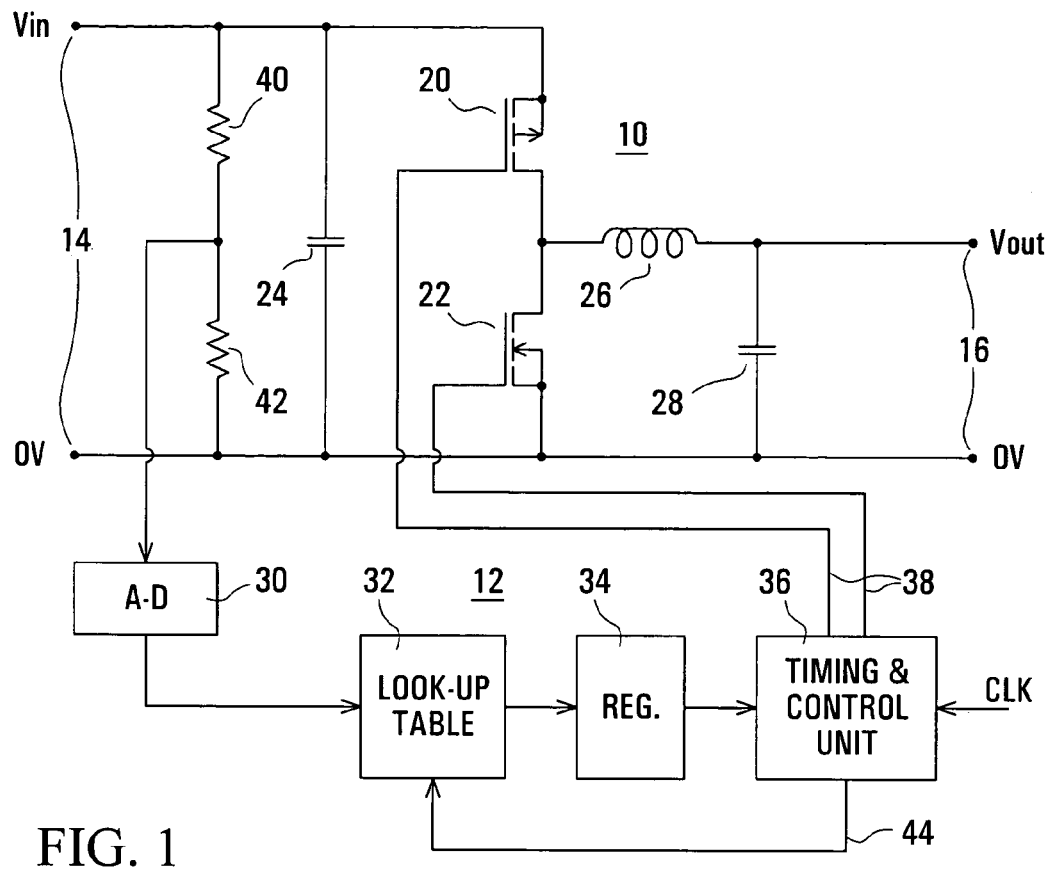
FIG. 1 schematically illustrates a buck regulator and a digital controller in accordance with a first embodiment of the invention.

Referring to the drawings, FIG. 1 schematically illustrates a known form of a buck regulator 10 and a digital controller 12 in accordance with a first embodiment of the invention. The digital controller 12 of FIG. 1 provides open loop, feed forward control of the buck regulator as further described below. The buck regulator 10 serves to convert an input voltage Vin supplied to input terminals 14 to a lower output voltage Vout at output terminals 16.

Although the buck regulator 10 is illustrated in FIG. 1 and described here, it can be appreciated that other forms of buck converter (such as an isolated buck converter including an isolating transformer, whether or not the output terminals 16 are isolated from the input terminals 14), other forms of DC converter using only one switch or using a plurality of switches controlled in synchronism, or other forms of electrical circuit with one or more switches controlled by one or more pulsed signals, can be provided in place of the illustrated buck regulator 10 and can be controlled by a controller such as the controller 12 in a similar manner to that described below.

The buck regulator 10 comprises a primary switch constituted by a MOSFET 20 and a secondary switch constituted by a MOSFET 22 which are coupled in series between the input terminals 14, an input capacitor 24 also coupled between the input terminals 14, an output inductor 26 coupled between a junction between the MOSFETs 20 and 22 and one of the output terminals 16, and an output capacitor 28 coupled between this one of the output terminals and the other of the output terminals 16, which is also connected to one of the input terminals and is regarded as being at a common or reference voltage of 0V.

The MOSFETs 20 and 22 are controlled by pulses from the controller 12 supplied to their gates with timing as described further below. Ideally, the MOSFETs 20 and 22 would be controlled to conduct alternately in a precisely complementary manner, but because the MOSFETs 20 and 22 have their drain-source or controlled paths coupled in series between the input terminals 14, in view of finite switching times, signal propagation delays, etc. as is known, the turn-on of each of the MOSFETs 20 and 22 is slightly delayed relative to the turn-off of the respective other MOSFET 22 and 20, respectively, to avoid simultaneous conduction of the MOSFETs and hence a short circuit of the input voltage Vin.

The operation of the buck regulator 10 itself is well known in the art and need not be described here. The buck regulator 10 may also include additional components to facilitate its operation or start-up, which are not described in detail here. For example, the output terminals 16 may be coupled, optionally via a further voltage regulator, to power supply connections of the controller 12 to supply power thereto, and start-up of the buck regulator 10 and controller 12 can be facilitated by a further switch coupled between the upper, not-interconnected, ones of the input and output terminals and also controlled by the controller 12 to be conductive only during start-up.

The controller 12 comprises an A-D (analog-to-digital) converter 30, a look-up table 32 for example contained in non-volatile memory, a register 34 for an output of the look-up table, and a timing and control unit 36 which is supplied with a clock signal CLK, supplies control pulses as further described below to the gates of the MOSFETs 20 and 22 via lines 38, and can also access the look-up table 32 as further described below. The controller 12 also includes a potential divider comprising resistors 40 and 42 coupled in series between the input terminals 14, a tapping point of which is coupled to an input of the A-D converter 30 whereby a voltage representing the input voltage Vin is supplied to the A-D converter 30 and is converted to a digital value. This digital value is used to address the look-up table 32 as described further below.

In order to facilitate further description and understanding of the operation of the controller 12, a specific example, and specific parameters such as voltage ranges, digital values, clock frequencies, etc., are given below. It can be appreciated that these are given only by way of example and not by way of limitation, and that any and/or all of such details may be changed without departing from the invention.

By way of example, it is assumed that the input voltage Vin can be any voltage in a wide range from 10V or less to 100V, and that the output voltage Vout is desired to be nominally 4.5V. It can be appreciated that these voltages imply that a duty cycle of the buck regulator 10 (ratio of on-time of the MOSFET 20 to on-time plus off-time of the MOSFETs) must be variable over a wide range from about 45% to about 4.5%. The latter constitutes a very narrow duty cycle, for which in a known digital PWM controller very small changes in the switching times of the MOSFETs 20 and 22 produce comparatively large output voltage changes. Consequently, as indicated in the Background above this presents a considerable problem for digital control of the buck regulator 10 to achieve a reasonable resolution of the output voltage Vout.

This problem is avoided in the controller 12 by varying both the on-time and the off-time of the MOSFET 20 (equivalently, the on-times of both of the MOSFETs 20 and 22) in a non-linear manner, depending upon the input voltage Vin, to provide the desired duty cycle.

More specifically, the A-D converter is arranged to produce a 7-bit digital value which represents the input voltage Vin, at least over its range from 10V to 100V, in steps each of 0.8V. This 7-bit digital value is used to address the look-up table 32, thereby to supply to the register 34 stored information which represents both a desirable value D1 for the on-time of the MOSFET 20 and a desirable value D2 for the off-time of the MOSFET 20 (or the on-time of the MOSFET 22).

For convenience as further described below, this stored information comprises 8 bits for each addressed location in the look-up table 32, and the values D1 and D2 represent nominal on- and off-times of the respective MOSFETs 20 and 22, including the non-overlap or turn-on delays to avoid simultaneous conduction of the MOSFETs as described above, in time steps or ticks each of 50 ns (one period of a 20 MHz clock). Also for convenience, the clock signal CLK supplied to the timing and control unit 36 has a frequency of 80 MHz, and the non-overlap or turn-on delays are selected in 12.5 ns steps each corresponding to one period of this clock signal CLK.

Figure 2:
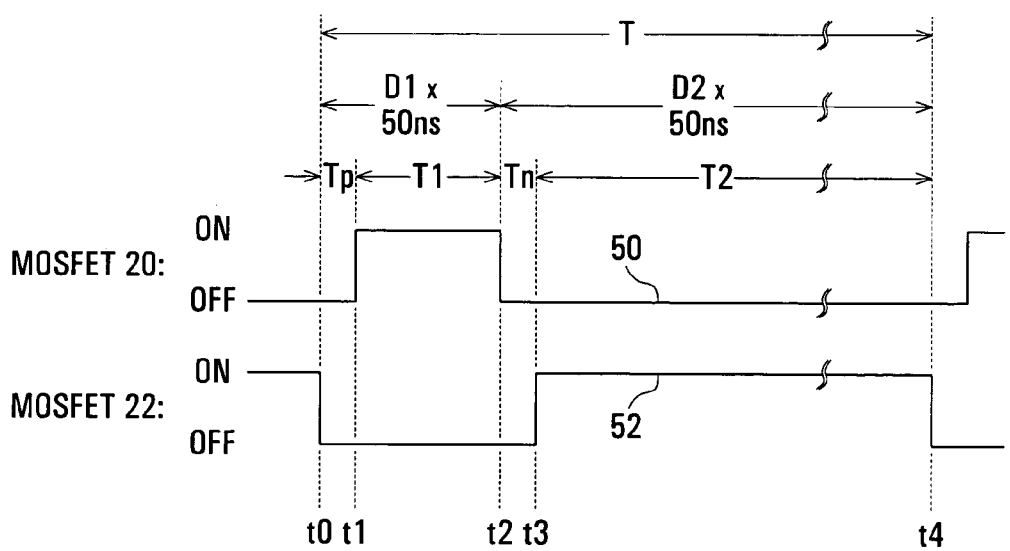
FIG. 2 is a timing diagram illustrating by way of example control pulses produced in operation of the digital controller of FIG. 1.

The timing diagram in FIG. 2 illustrates the timing of the control pulses consequently produced in operation of the controller 12. A rectangular waveform 50 represents the timing of pulses supplied by the timing and control unit 36 to the gate of the MOSFET 20 constituting the primary switch of the buck regulator 10, and a rectangular waveform 52 represents the timing of pulses supplied by the timing and control unit 36 to the gate of the MOSFET 22 constituting the secondary switch of the buck regulator 10; it is noted that these waveforms do not necessarily reflect the polarities of the control pulses, but only their timing and the consequent states (on or off) of the MOSFETs.

Referring to FIG. 2, in each of a plurality of successive switching cycles starting at a time t0 at which the MOSFET 22 is turned off, the MOSFET 20 is turned on by a pulse of the waveform 50 commencing at a time t1 after a non-overlap or turn-on delay Tp for this MOSFET and ending at a time t2, the pulse duration T1 being equal to 50 ns multiplied by the value D1, minus Tp. Conversely, from the time t2 at which the MOSFET 20 is turned off, the MOSFET 22 is turned on by a pulse of the waveform 52 commencing at a time t3 after a non-overlap or turn-on delay Tn for this MOSFET and ending at a time t4, the pulse duration T2 in this case being equal to 50 ns multiplied by the value D2, minus Tn. The time t4 corresponds to the time t0 for the next switching cycle.

Consequently, the controller 12 provides a nominal duty cycle of D1/(D1+D2) and an actual duty cycle of T1/T where T=Tp+T1+Tn+T2=(D1+D2)*50 ns, and a switching frequency of 1/T.

The following table represents, for various 0.8V steps of the input voltage Vin, the resulting digital values or look-up table addresses produced by the A-D converter 30, decimal values of D1 and D2, the resulting switching frequency, binary values of D1 and D2, and a range of consequent values of the output voltage Vout. For the purposes of this table, the total turn-on or non-overlap delay Tp+Tn is assumed to be zero.

| Vin range (V) | A–D output | D1 | D2 | Frequency (kHz) | D1 binary | D2 binary | Vout range (V) |
|---|---|---|---|---|---|---|---|
| 5.6–6.4 | 7 | 15 | 5 | 1000 | 1111 | 0101 | 4.20–4.80 |
| 6.4–7.2 | 8 | 13 | 7 | 1000 | 1101 | 0111 | 4.16–4.68 |
| 7.2–8.0 | 9 | 12 | 8 | 1000 | 1100 | 1000 | 4.32–4.80 |
| 8.0–8.8 | 10 | 11 | 10 | 952 | 1011 | 1010 | 4.19–4.61 |
| 8.8–9.6 | 11 | 10 | 10 | 1000 | 1010 | 1010 | 4.40–4.80 |
| 9.6–10.4 | 12 | 9 | 11 | 1000 | 1001 | 1011 | 4.32–4.68 |
| 10.4–11.2 | 13 | 8 | 11 | 1053 | 1000 | 1011 | 4.38–4.72 |
| 11.2–12.0 | 14 | 8 | 13 | 952 | 1000 | 1101 | 4.27–4.57 |
| 12.0–12.8 | 15 | 7 | 12 | 1053 | 111 | 01100 | 4.42–4.72 |
| 12.8–13.6 | 16 | 7 | 14 | 952 | 111 | 01110 | 4.27–4.53 |
| 13.6–14.4 | 17 | 6 | 13 | 1053 | 110 | 01101 | 4.29–4.55 |
| 14.4–15.2 | 18 | 6 | 14 | 1000 | 110 | 01110 | 4.32–4.56 |
| 15.2–16.0 | 19 | 6 | 15 | 952 | 110 | 01111 | 4.34–4.57 |
| 16.0–16.8 | 20 | 5 | 13 | 1111 | 101 | 01101 | 4.44–4.67 |
| 16.8–17.6 | 21 | 5 | 14 | 1053 | 101 | 01110 | 4.42–4.63 |
| 17.6–18.4 | 22 | 5 | 15 | 1000 | 101 | 01111 | 4.40–4.60 |
| 18.4–19.2 | 23 | 5 | 16 | 952 | 101 | 10000 | 4.38–4.57 |
| 19.2–20.0 | 24 | 5 | 17 | 909 | 101 | 10001 | 4.36–4.55 |
| 20.0–20.8 | 25 | 4 | 14 | 1111 | 100 | 01110 | 4.44–4.62 |
| 20.8–21.6 | 26 | 4 | 15 | 1053 | 100 | 01111 | 4.38–4.55 |
| . | . | . | . | . | . | . | . |
| . | . | . | . | . | . | . | . |
| . | . | . | . | . | . | . | . |

-continued

| Vin range (V) | A–D output | D1 | D2 | Frequency (kHz) | D1 binary | D2 binary | Vout range (V) |
|---|---|---|---|---|---|---|---|
| 56.8–57.6 | 71 | 2 | 23 | 800 | 010 | 10111 | 4.54–4.61 |
| 57-6–58.4 | 72 | 2 | 24 | 769 | 010 | 11000 | 4.43–4.49 |
| 58.4–59.2 | 73 | 2 | 24 | 769 | 010 | 11000 | 4.49–4.55 |
| 59.2–60.0 | 74 | 2 | 24 | 769 | 010 | 11000 | 4.55–4.62 |
| 60.0–60.8 | 75 | 1 | 12 | 1538 | 001 | 01100 | 4.62–4.68 |
| 60.8–61.6 | 76 | 1 | 13 | 1429 | 001 | 01101 | 4.34–4.40 |
| 61.6–62.4 | 77 | 1 | 13 | 1429 | 001 | 01101 | 4.40–4.46 |
| . | . | . | . | . | . | . | . |
| . | . | . | . | . | . | . | . |
| 96.0–96.8 | 120 | 1 | 20 | 952 | 001 | 10100 | 4.57–4.61 |
| 96.8–97.6 | 121 | 1 | 21 | 909 | 001 | 10101 | 4.40–4.44 |
| 97.6–98.4 | 122 | 1 | 21 | 909 | 001 | 10101 | 4.44–4.47 |
| 98.4–99.2 | 123 | 1 | 21 | 909 | 001 | 10101 | 4.47–4.51 |
| 99.2–100.0 | 124 | 1 | 21 | 909 | 001 | 10101 | 4.51–4.55 |
| 100.0–100.8 | 125 | 1 | 21 | 909 | 001 | 10101 | 4.55–4.58 |
| 100.8–101.6 | 126 | 1 | 21 | 909 | 001 | 10101 | 4.58–4.62 |
| 101.6–102.4 | 127 | 1 | 22 | 870 | 001 | 10110 | 4.42–4.45 |

It can be appreciated from the table that, for each 0.8V range of the input voltage Vin, the values D1 and D2 are selected so that their sum D1+D2 is as close as is practical to a predetermined nominal value of 20, corresponding to a nominal, switching frequency of 1 MHz, consistent with providing a range for the output voltage Vout which is close to the nominal output voltage of 4.5V. The table shows that the switching frequency can vary from 769 to 1538 kHz, and the output voltage can vary from 4.27 to 4.72V, for input voltages in the range from 10 to 100V.

More particularly, it can be seen from the table that, the sum D1+D2 varies within a predetermined range of about two-thirds to about four-thirds of the predetermined nominal value, in this case from 13 to 26 for the nominal value of 20, so that the corresponding pulse on-time and off-time for the MOSFET 20 likewise vary in a predetermined range from about two-thirds to about four-thirds of a predetermined nominal value of 1 µs (20 times 50 ns) corresponding to the nominal switching frequency of 1 MHz.

Figure 3:
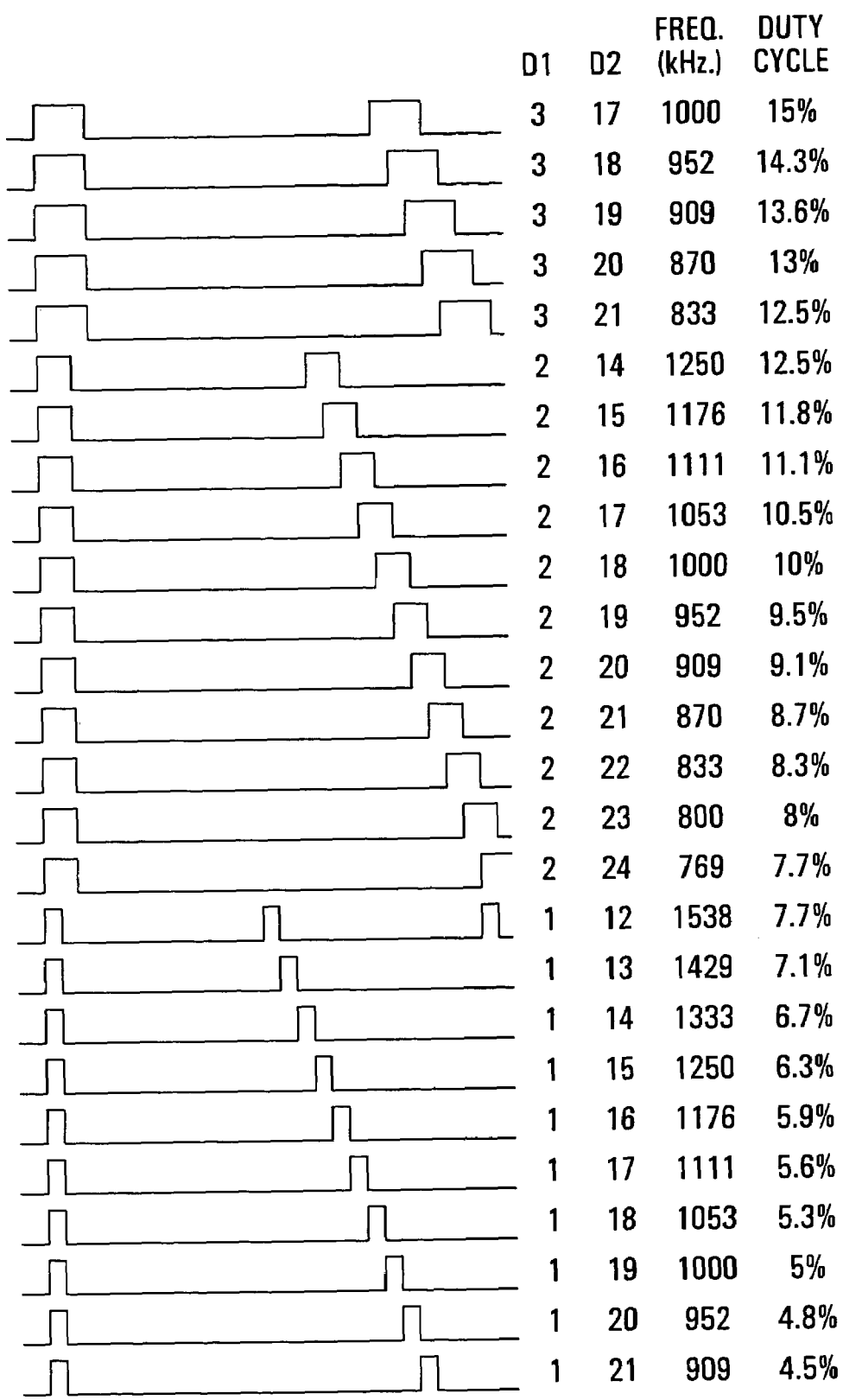
FIG. 3 is a diagram illustrating variation of frequency and duty cycle of a control pulse signal produced by the digital controller of FIG. 1.

FIG. 3 illustrates how the frequency and duty cycle of the control pulse signal for the MOSFET 20 produced by the controller 12 varies in accordance with the values D1 and D2 stored in the look-up table 32, as indicated by the table above, for a range of duty cycles from 15% to 4.5%. For simplicity and clarity, the waveforms are shown in FIG. 3 assuming that the respective turn-on delay Tp is zero.

As can be seen from the successive waveforms, associated values D1 and D2, and the resulting control pulse frequency and duty cycle in FIG. 3, for a small duty cycle (bottom of FIG. 3) of 4.5% the value of D1 is small (in this case D1=1) compared with the value D2. As the duty cycle is increased from 4.5% the value D2 is decreased while the value D1=1 remains constant, resulting in the frequency being increased. At a duty cycle of 7.7%, the value D1 is increased to D1=2, and the value D2 is increased, so that the frequency is substantially decreased. For continuing increases in the duty cycle, the value D2 is again decreased while the value D1=2 remains constant, the frequency consequently again being successively increased. At a duty cycle of 12.5%, the value D1 is again increased to D1=3, and the value D2 is increased, so that the frequency is again substantially decreased. For continuing further increases in the duty cycle, the value D2 is again decreased while the value D1=3 remains constant, the frequency consequently again being successively increased. A similar pattern can be followed for further continuing increases in the duty cycle.

It can be seen that the waveforms in FIG. 3 for a duty cycle of 7.7% with D1=2 and D1=1 represent respectively the greatest and least sums D1+D2, corresponding respectively to the lowest and greatest control pulse frequencies. The greatest sum D1+D2=26 is about four-thirds of the nominal sum of 20, and the least sum D1+D2=13 is about half of this and is about two-thirds of the nominal sum 20. Likewise, the greatest frequency is about twice the least frequency, and these frequencies are respectively about four-thirds and about two-thirds the nominal switching frequency of 1 MHz.

It can be appreciated that only one of the two control pulse waveforms shown in FIG. 3 with the duty cycle of 7.7% need be provided, and likewise only one of the two control pulse waveforms shown in FIG. 3 with the duty cycle of 12.5% need be provided, because in each case the two waveforms produce substantially the same results.

The non-volatile memory used for the look-up table 32 is in this example conveniently implemented with 128 8-bit memory locations, of which the lowest address locations 0 to 6 are not used for values of D1 and D2 as shown in the table. These lowest address locations conveniently are used for overhead information, accessed by the timing and control unit 36 as represented by a path 44 in FIG. 1, for example as follows:

Address location 0 can contain a pointer to the lowest address location in the look-up table which is used for values of D1 and D2; for example this may be address location 7 in the table above.

Address location 1 can contain a pointer to an address location in the look-up table at which there is a change in the representation of the values D1 and D2. For example this may be address location 15 in the table above. It can be seen from the table that below this address location four bits are used for each of D1 and D2, whereas from this address location and above three bits are used for D1 and five bits are used for D2. The use of this pointer enables every pair of values D1 and D2 to be stored in an 8-bit address location, simplifying the implementation of the look-up table in memory.

Address locations 2 and 3 can be used to store values representing, in 12.5 ns steps corresponding to the period of the 80 MHz clock signal CLK, the turn-on or non-overlap delays Tp and Tn respectively.

Address location 4 can be used to store a 2-bit scaling factor for the values D1 and D2. For example, a 2-bit scaling factor 00 can represent that the stored D1 and D2 values in 50 ns ticks are to be multiplied by 4 (left-shifted by two binary digits) to represent 12.5 ns periods of the 80 MHz clock signal CLK, for a nominal switching frequency of 1 MHz as described above. Other 2-bit scaling factors 01, 10, and 11 can represent that the stored D1 and D2 values are to be multiplied by 8, 16, or 32 (respectively, left-shifted by 3, 4, or 5 binary digits) to give nominal switching frequencies of respectively 500 kHz, 250 kHz, and 125 kHz.

These lower address locations in the non-volatile memory are initially read by the timing and control unit 36 and stored in registers in this unit 36, so that they can be used in the subsequent operation of this controller 12. The timing and control unit 36 can include, in addition to these registers, counters responsive to the clock signal CLK for timing the turn-on or non-overlap delay periods Tp and Tn in accordance with the values read from the address locations 2 and 3 respectively, and counters responsive to the clock signal CLK for timing the pulse periods, e.g. T1−Tp and T2−Tn, in accordance with the respective values D1 and D2 read from the look-up table 32. These counters can be hardware or software counters. Alternatively, the timing and control unit 36 can be implemented in any other convenient manner for converting the values read from the memory into the corresponding pulse signals illustrated in FIG. 2.

Figure 4:
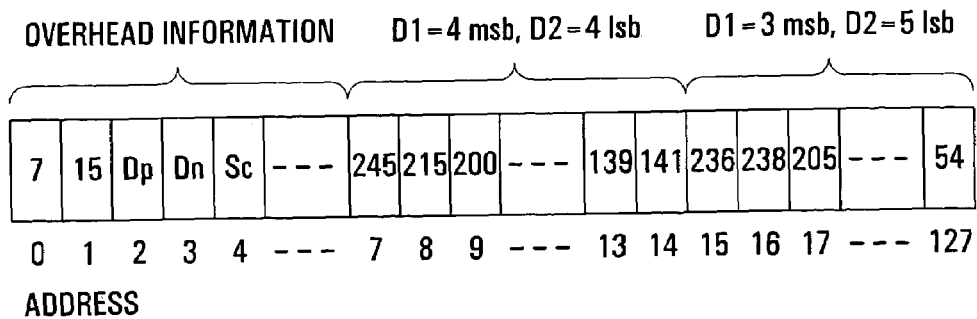
FIG. 4 illustrates an arrangement of a look-up table of the digital controller of FIG. 1.

FIG. 4 illustrates a resulting arrangement of the look-up table 32 of the controller 12, showing as symbols and decimal numbers the contents of various address locations of the table. As shown in FIG. 4 and as described above, address location 0 contains a pointer "7" to the lowest address location in the table which is used for values of D1 and D2; below this address the table contains overhead information or unused address locations.

Address location 1 contains a pointer "15" to the address location in the table at which there is a change in the representation of the values D1 and D2. As shown in FIG. 4, in each of the address locations 7 to 14 below the address 15 and constituting a first part of the table, the value D1 is represented by the 4 most significant bits (msb) and the value D2 is represented by the 4 least significant bits (lsb) of the 8-bit number stored in the respective location. For example, address location 8 contains the 8-bit binary number 11010111, whose decimal equivalent is 215 as shown in FIG. 4, of which the 4 msb are 1101 representing D1=13 and the 4 lsb are 0111 representing D2=7 as shown in the table above. In each of the address locations 15 to 127, constituting a second part of the table, the value D1 is represented by the 3 msb and the value D2 is represented by the 5 lsb of the 8-bit number stored in the respective location. For example, address location 17 contains the 8-bit binary number 11001101, whose decimal equivalent is 205 as shown in FIG. 4, of which the 3 msb are 110 representing D1=6 and the 5 lsb are 01101 representing D2=13 as shown in the table above.

Address locations 2 and 3 contain values Dp and Dn which represent the times Tp and Tn respectively in 12.5 ns steps, and address location 4 contains a value Sc, 2 bits of which represent the scaling factor as described above.

One of the benefits of the controller 12 as described above can be appreciated from considering the effect of a change in the input voltage Vin, especially for low duty cycle operation of the buck regulator 10.

For example, as can be seen from the table above, a change of about 4% of the input voltage Vin from 96.0 to 100.0V results in a change in the value D2 from 20 to 21, the value D1 being 1 in each case. Thus the duty cycle, D1/(D1+D2), changes from 1/21 to 1/22, i.e. from 4.76% to 4.54%, a duty cycle change of about 0.22%. This small change in duty cycle is achievable with a clock frequency of 20 MHz, because the values D1 and D2 are in 50 ns steps (the higher frequency of 80 MHz for the clock signal CLK is only required for the selected 12.5 ns resolution of the delays Tp and Tn; these delays could instead be provided in a different manner, e.g. using delay elements, or at a lower resolution). The regulator switching frequency is nominally 1 MHz, and actually changes from 952 to 909 kHz in this example.

In contrast, a known digital PWM control arrangement for the buck regulator 10, operating with a constant switching frequency of 1 MHz and a controlled pulse width, would require a very much higher clock frequency of about 450 MHz to achieve a similar 0.22% change in duty cycle.

Accordingly, the controller 12 facilitates precise control of the buck regulator 10, especially at low duty cycles, without a substantial increase in clock frequency which would be required in a known digital PWM control arrangement.

Although as described above the values D1 and D2 are stored in the look-up table 32, it will be appreciated that any two other values providing similar information can equivalently be stored instead. For example, the value D1 and the sum D1+D2 can be stored in the look-up table 32 instead of the values D1 and D2.

The controller 12 of FIG. 1 as described above provides open-loop, feed forward control of the buck regulator 10. This may alone be sufficient to provide a desired regulation of the output voltage Vout, or further regulation may be provided at the output of the buck regulator 10. For example, the nominal 4.5V output voltage described above may be further regulated by a known form of low dropout voltage regulator connected to the output terminals 16 of the buck regulator 10, to provide a lower and better regulated output voltage of for example 3.3V.

The controller 12 may also be supplemented with a closed loop feedback control arrangement. One particular example of this is illustrated in FIG. 5 and described below.

Figure 5:
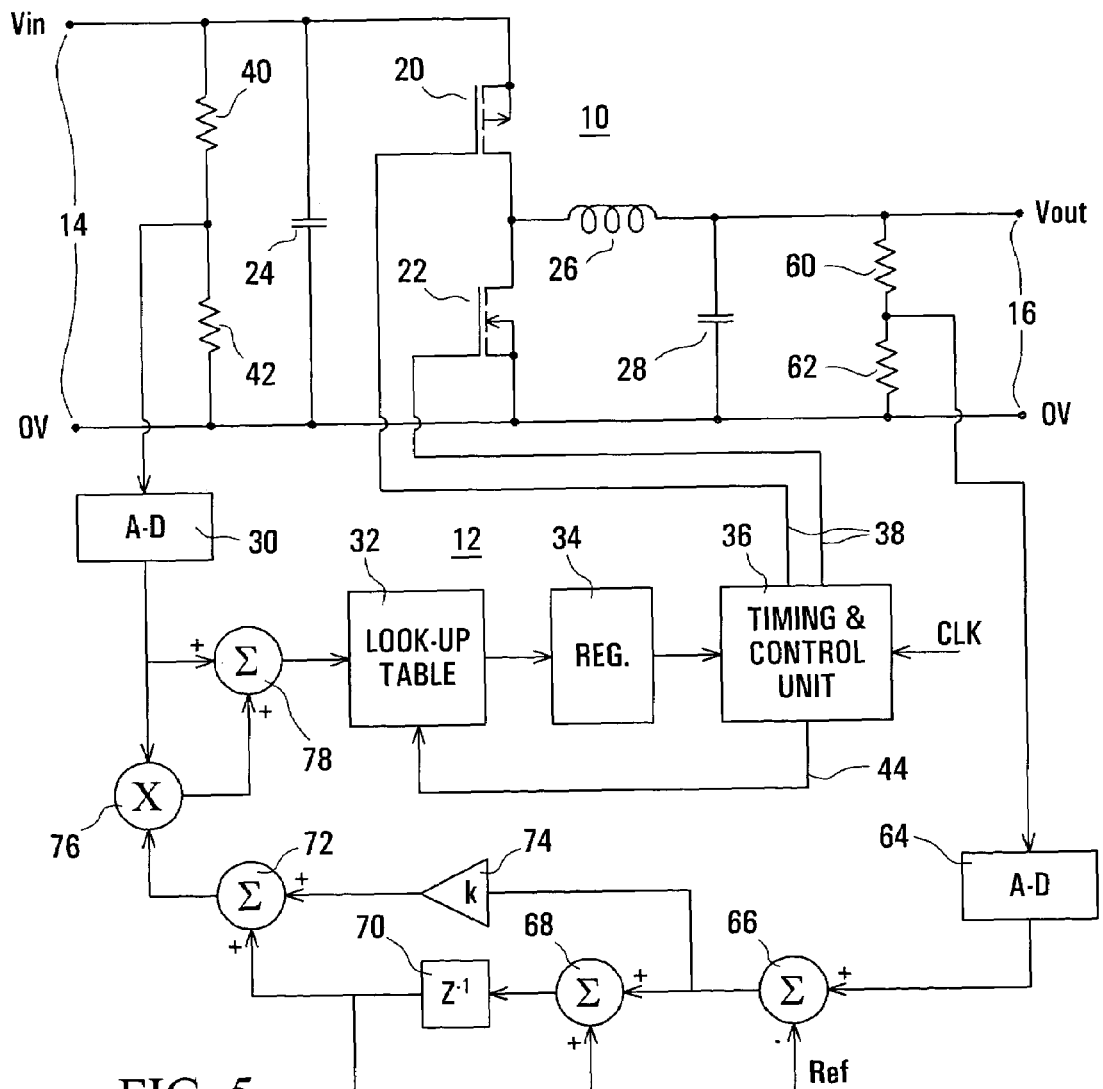
FIG. 5 schematically illustrates a buck regulator and a digital controller in accordance with a second embodiment of the invention.

FIG. 5 shows the buck regulator 10 and the controller having the same arrangements as described above with reference to FIG. 1, and accordingly the description of these is not repeated. In addition, the controller 12 in FIG. 5 includes closed loop feedback control provided by resistors 60 and 62, an A-D converter 64, adders 66, 68, 72, and 78, a delay element 70, a gain element 74 having a gain k which may be greater than or less than one, and a multiplier 76.

The resistors 60 and 62 form a potential divider coupled between the output terminals 16 of the buck regulator 10, a tapping point of which is coupled to an input of the A-D converter 64 whereby a voltage representing the output voltage Vout is supplied to the A-D converter 64 and is converted to a digital value. The adder 66 subtracts a digital reference value Ref from this digital value produced by the A-D converter 64, to produce a digital error value for closed loop feedback control. The adder 78 is inserted in the digital path from the A-D converter 30 to the look-up table 32, where it serves to add a digital closed loop correction value to the digital value output by the A-D converter 30. The elements 68 to 76 produce the digital closed loop correction value from the digital error value.

It can be appreciated that in this example the elements 66 to 78 are all digital elements operating on digital values, and they can be implemented in hardware or software.

The digital error value produced by the adder 66 can for example be an 8-bit value, with a sign bit. The elements 68 and 70 integrate this with a desired integration time constant, and the adder 72 adds to the integration result a proportional term supplied via the gain element 74. The gain k is conveniently a power of 2, so that the gain element 74 can be constituted by a left or right shift of the bits of the digital error value. The output of the adder 72 constitutes a correction multiplier, for example comprising the sign bit and the four most significant bits of the sum produced by the adder 72.

The multiplier 76, which can operate at the sampling rate of the A-D converter 30, serves to produce the digital closed loop correction value by multiplying the digital value produced by the A-D converter 30 by the correction multiplier, thereby scaling the correction value in accordance with the input voltage Vin. This is desirable because a given change of the look-up table address corresponds to a percentage change of the input voltage Vin which is much greater at low input voltages than at higher voltages. By way of example, the most significant four bits of the product produced by the multiplier 78, plus the sign bit, are supplied to the adder 78 to offset the look-up table address to achieve the closed loop feedback correction.

Although embodiments of the invention are described above in the context of synchronously controlling the two switching transistors 20 and 22 of the buck regulator 10, the controller 12 is not limited to this application. For example, it may be used to control a single switching transistor, in a similar manner to that described above for control of the MOSFET 20 or the MOSFET 22, or to control two or more switching transistors in a synchronous manner. Furthermore, such switching transistors can be elements of any other form of DC converter, or of other circuits requiring control pulses. In addition, the controller may similarly be used to provide control pulses to devices other than switching transistors. Accordingly, the invention is not limited to the particular application to a DC converter as described by way of example above.

In addition, although as described above the digital controller 12 uses the look-up table 32 to determine the values D1 and D2 from stored information, it is possible for these values instead to be calculated by the controller 12 for example at the sampling rate of the A-D converter 30.

Thus although particular embodiments of the invention and variations and applications have been described above in detail, it can be appreciated that these and numerous other modifications, variations, and adaptations may be made without departing from the scope of the invention as defined in the claims.

The invention claimed is:

1. A digital controller for producing a control pulse signal with a variable frequency and a duty cycle dependent upon a first digital value representing a first variable, comprising:
   a digital circuit responsive to the first digital value for producing second and third digital values representing an on-time of a pulse and an off-time between pulses of the control pulse signal; and
   a timing and control unit responsive to the second and third digital values to produce the control pulse signal with pulses dependent upon said on-time and off-time;
   wherein the second and third digital values are produced so that a sum of the on-time and the off-time varies, depending on the first digital value, within a predetermined range including a predetermined nominal period of the control pulse signal, and wherein the digital circuit comprises a look-up table in which the second and third digital values are stored for respective first digital values.

2. A digital controller as claimed in claim 1 wherein the predetermined range is about two-thirds to about four-thirds of the predetermined nominal period.

3. A digital controller as claimed in claim 1 wherein the second and third digital values are represented using a first and a second number of bits, respectively, in a first part of the table and are represented using a third and a fourth number of bits, respectively, in a second part of the table, the third and fourth numbers being different from the first and second numbers, respectively, and having a sum equal to a sum of the first and second numbers.

4. A digital controller as claimed in claim 3 wherein the table is also arranged to store a pointer to a transition between the first and second parts of the table.

5. In combination, a DC converter, a digital controller as claimed in claim 1, and an A-D (analog-to-digital) converter for producing the first digital value in dependence upon an input voltage of the DC converter, wherein the DC converter comprises at least one switch controlled by the control pulse signal.

6. A digital controller for producing a control pulse signal with a variable frequency and a duty cycle dependent upon a first digital value representing a first variable, comprising:
   a digital circuit responsive to the first digital value for producing second and third digital values representing an on-time of a pulse and an off-time between pulses of the control pulse signal; and
   a timing and control unit responsive to the second and third digital values to produce the control pulse signal with pulses dependent upon said on-time and off-time;
   wherein the second and third digital values are produced so that a sum of the on-time and the off-time varies, depending on the first digital value, within a predetermined range including a predetermined nominal period of the control pulse signal;
   the digital controller further comprising a further digital circuit responsive to a further digital value representing a second variable for modifying the first digital value in dependence upon the further digital value, wherein the further digital circuit comprises:
   a digital circuit responsive to the further digital value for producing a digital multiplier value in dependence upon a difference between the second variable and a reference value;
   a multiplier for multiplying the first digital value by the digital multiplier value to produce a digital correction value; and
   an adder for adding the digital correction value to the first digital value to produce a modified first digital value.

7. In combination, a DC convener, a digital controller as claimed in claim 6, an A-D (analog-to-digital) converter for producing the first digital value in dependence upon an input voltage of the DC converter, and an A-D converter for producing the further digital value in dependence upon an output voltage of the DC converter, wherein the DC converter comprises at least one switch controlled by the control pulse signal.

8. A digital controller for producing a control pulse signal for a switch of a DC converter for varying a duty cycle and a switching frequency of the DC converter in dependence upon an input voltage for the DC converter, the digital controller comprising:
   an A-D (analog-to-digital) converter for producing a first digital value in dependence upon said input voltage;
   a timing and control unit for producing the control pulse signal with pulse on- and off-times determined in dependence upon second and third digital values; and
   a look-up table in which the second and third digital values are stored for respective first digital values, the look-up table being responsive to the first digital value to provide respective stored second and third digital values to the timing and control unit;

wherein the stored second and third digital values are such that a sum of the on- and off-times varies, depending on the first digital value, over a predetermined range which includes a predetermined nominal period of the control pulse signal.

9. A digital controller as claimed in claim 8 wherein the predetermined range is about two-thirds to about four-thirds of the predetermined nominal period.

10. A digital controller as claimed in claim 8 wherein the second and third digital values are stored using a first and a second number of bits, respectively, in a first part of the table and using a third and a fourth number of bits, respectively, in a second part of the table, the third and fourth numbers being different from the first and second numbers, respectively, and having a sum equal to a sum of the first and second numbers.

11. A digital controller as claimed in claim 10 wherein the table is also arranged to store a pointer to a transition between the first mid second parts of the table.

12. A digital controller as claimed in claim 8 and comprising an A-D converter for producing a further digital value in dependence upon an output voltage of the DC converter, and a further digital circuit responsive to the further digital value for modifying the first digital value in dependence upon the further digital value.

13. A digital controller as claimed in claim 12 wherein the further digital circuit comprises:
 a digital circuit responsive to the further digital value for producing a digital multiplier value in dependence upon a difference between the output voltage of the DC converter and a reference value;
 a multiplier for multiplying the first digital value by the digital multiplier value to produce a digital correction value; and
 an adder for adding the digital correction value to the first digital value to produce a modified first digital value for addressing the look-up table.

14. A digital controller for producing a control pulse signal, comprising:
 a look-up table for storing, and for providing in response to a first digital value in dependence upon which the look-up table is addressed, respective second and third digital values representing an on-time of a pulse and an off-time between pulses of the control pulse signal; and
 a timing and control unit responsive to the second and third digital values to produce the control pulse signal with pulses determined by said on-time and off-time;
 wherein the second and third digital values stored in the look-up table are such that:
 for providing the control pulse signal with a small duty cycle the second digital value representing the on-time is small compared with the third digital value;
 for providing the control pulse signal with an increased duty cycle the second digital value is unchanged and the third digital value is decreased whereby a frequency of the control pulse signal is increased;
 for providing the control pulse signal with a further increased duty cycle the second digital value is increased and the third digital value is increased whereby the frequency of the control pulse signal is decreased;
 and for providing the control pulse signal with a yet further increased duty cycle the second digital value is again unchanged and the third digital value is decreased whereby the frequency of the control pulse signal is increased.

15. A digital controller as claimed in claim 14 wherein the second and third digital values are such that the frequency of the control pulse signal varies over a range of up to about 2:1.

16. A digital controller as claimed in claim 14 wherein the second and third digital values are stored using a first and a second number of bits, respectively, in a first part of the lock-up table and using a third and a fourth number of bits, respectively, in a second part of the lock-up table, the third and fourth numbers being different from the first and second numbers, respectively, and having a sum equal to a sum of the first and second numbers.

17. A digital controller as claimed in claim 16 wherein the look-up table is also arranged to store a pointer to a transition between the first and second parts of the table.

18. A digital controller as claimed in claim 14 and comprising a further digital circuit responsive to a further digital value for modifying the first digital value for addressing the look-up table in dependence upon the further digital value.

19. A digital controller as claimed in claim 18 wherein the further digital circuit comprises:
 a digital circuit responsive to the further digital value for producing a digital multiplier value in dependence upon a difference between the second variable and a reference value;
 a multiplier for multiplying the first digital value by the digital multiplier value to produce a digital correction value; and
 an adder for adding the digital correction value to the first digital value to produce a modified first digital value for addressing the look-up table.

20. In combination, a DC converter, a digital controller as claimed in claim 14, and an A-D (analog-to-digital) converter for producing the first digital value in dependence upon an input voltage of the DC convener, wherein the DC convener comprises at least one switch controlled by the control pulse signal.

21. In combination, a DC converter, a digital controller as claimed in claim 19, an A-D (analog-to-digital) converter for producing the first digital value in dependence upon an input voltage of the DC converter, and an A-D converter for producing the further digital value in dependence upon an output voltage of the DC converter, wherein the DC converter comprises at least one switch controlled by the control pulse signal.

22. A method of producing a control pulse signal having a variable frequency and a variable duty cycle, comprising the steps of:
 producing, in response to a first digital value, respective second and third digital values representing an on-time of a pulse and an off-time between pulses of the control pulse signal; and
 producing the control pulse signal in response to the second and third digital values with pulses determined by said on-time and off-time;
 wherein the second and third digital values are produced so that:
 for producing the control pulse signal with a small duty cycle the second digital value representing the on-time is small compared with the third digital value;
 for producing the control pulse signal with an increased duty cycle the second digital value is unchanged and the third digital value is decreased whereby a frequency of the control pulse signal is increased;
 for producing the control pulse signal with a further increased duty cycle the second digital value is increased and the third digital value is increased whereby the frequency of the control pulse signal is decreased;

and for producing the control pulse signal with a yet further increased duty cycle the second digital value is again unchanged and the third digital value is decreased whereby the frequency of the control pulse signal is increased.

23. A method as claimed in claim 22 wherein the second and third digital values are produced so that a frequency of the control pulse signal varies over a range of up to about 2:1.

24. A method as claimed in claim 22 wherein the step of producing the second and third digital values comprises addressing a look-up table in dependence upon the first digital value.

25. A method of controlling a DC converter comprising at least one switch, comprising producing a control pulse signal by a method as claimed in claim 22, controlling said at least one switch of the DC converter with the control pulse signal, and producing said first digital value in dependence upon an input voltage of the DC converter.

* * * * *